United States Patent
Chen et al.

(10) Patent No.: US 11,218,353 B2
(45) Date of Patent: Jan. 4, 2022

(54) PAGING IN BEAMFORMED WIRELESS COMMUNICATION SYSTEM

(71) Applicant: MEDIATEK SINGAPORE PTE. LTD., Singapore (SG)

(72) Inventors: Tao Chen, Beijing (CN); Pei-Kai Liao, Hsinchu (TW); Chien Hwa Hwang, Hsinchu (TW); Min Wu, Beijing (CN); Jianwei Zhang, Beijing (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 68 days.

(21) Appl. No.: 16/619,715

(22) PCT Filed: Jun. 19, 2018

(86) PCT No.: PCT/CN2018/091761
§ 371 (c)(1),
(2) Date: Dec. 5, 2019

(87) PCT Pub. No.: WO2018/233587
PCT Pub. Date: Dec. 27, 2018

(65) Prior Publication Data
US 2020/0169446 A1 May 28, 2020

(30) Foreign Application Priority Data
Jun. 19, 2017 (CN) .......................... 201710467348.5

(51) Int. Cl.
*H04L 27/26* (2006.01)
*H04B 7/06* (2006.01)
(Continued)

(52) U.S. Cl.
CPC ....... *H04L 27/2657* (2013.01); *H04B 7/0617* (2013.01); *H04B 7/0695* (2013.01);
(Continued)

(58) Field of Classification Search
CPC ... H04L 27/2657; H04L 5/001; H04L 5/0048; H04L 5/0053; H04B 7/0617; H04B 7/0695; H04B 5/04; H04W 68/02; H04W 72/042
See application file for complete search history.

(56) References Cited

U.S. PATENT DOCUMENTS 9,363,803 B2   6/2016   Seo et al.
9,722,756 B2   8/2017   Seo et al.
(Continued)

FOREIGN PATENT DOCUMENTS

| CN | 104412684 A | 3/2015 |
| WO | WO 2015/080648 A1 | 6/2015 |
| WO | WO 2016/086144 A1 | 6/2016 |

OTHER PUBLICATIONS

Ericsson, "Summary of e-mail discussions on downlink control signaling" R1-1612908; TSG-RAN WG1 #87, Nov. 14-18, 2016. Total pp. 37.

(Continued)

*Primary Examiner* — Dady Chery
(74) *Attorney, Agent, or Firm* — Oblon, McClelland, Maier & Neustadt, L.L.P.

(57) ABSTRACT

Aspects of the disclosure provide a paging method. The method can include performing, by processing circuitry of a user equipment (UE), a downlink synchronization based on an synchronization signal (SS) block of an SS block burst received from a base station in a beamformed wireless communication system, detecting paging downlink control information (DCI) that is collocated with the SS block, and obtaining a paging message or a short message based on the paging DCI.

20 Claims, 10 Drawing Sheets

(51) Int. Cl.
    *H04L 5/00*     (2006.01)
    *H04W 68/02*    (2009.01)
    *H04W 72/04*    (2009.01)

(52) U.S. Cl.
    CPC ............ *H04L 5/001* (2013.01); *H04L 5/0048* (2013.01); *H04L 5/0053* (2013.01); *H04W 68/02* (2013.01); *H04W 72/042* (2013.01)

(56) References Cited

U.S. PATENT DOCUMENTS

| | | |
|---|---|---|
| 2015/0156763 A1 | 6/2015 | Seo et al. |
| 2016/0248571 A1 | 8/2016 | Seo et al. |
| 2017/0302424 A1 | 10/2017 | Seo et al. |
| 2017/0331670 A1* | 11/2017 | Parkvall ............... H04J 11/0056 |
| 2018/0324678 A1* | 11/2018 | Chen ....................... H04W 8/08 |
| 2019/0357303 A1* | 11/2019 | Xiong ................. H04W 56/001 |

OTHER PUBLICATIONS

International Search Report dated Aug. 29, 2018 in PCT/CN2018/091761 filed on Jun. 19, 2018.

* cited by examiner

PAGING IN BEAMFORMED WIRELESS COMMUNICATION SYSTEM

INCORPORATION BY REFERENCE

This present disclosure claims the benefit of Chinese Patent Application No. 201710467348.5, "Method and Apparatus for Decoding Paging Information" filed on Jun. 19, 2017, which is incorporated herein by reference in its entirety.

TECHNICAL FIELD

The present disclosure relates to wireless communications, and specifically relates to paging message transmission and reception in a wireless communication system.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

High frequency bands (e.g., above 6 GHz) is used in 5th Generation (5G) wireless communication systems to increase system capacity. Beamforming schemes can be employed to focus transmitted and/or received signal in a desired direction to compensate for unfavorable path loss of high frequency signals. For example, a base station may perform a beam sweeping to cover a serving area.

Paging can be used for network-initiated connection setup when a device is in radio resource control (RRC) idle mode. For example, the device can sleep with no receiver processing most of the time, and briefly wake up according to a predefined cycle to monitor paging information from the network.

SUMMARY

Aspects of the disclosure provide a paging method. The method can include performing, by processing circuitry of a user equipment (UE), a downlink synchronization based on an synchronization signal (SS) block of an SS block burst received from a base station in a beamformed wireless communication system, detecting paging downlink control information (DCI) that is collocated with the SS block, and obtaining a paging message or a short message based on the paging DCI.

In an embodiment, the paging DCI is carried in one or more first orthogonal frequency division multiplexing (OFDM) symbols, and/or one or more second OFDM symbols. The one or more first OFDM symbols are adjacent to the SS block. The one or more second OFDM symbols carry a primary synchronization signal (PSS) and/or a secondary synchronization signal (SSS) of the SS block. In one example, one or more first OFDM symbols are in front of or behind the SS block.

In an embodiment, the method further includes searching for a group identity (ID) on a physical downlink control channel (PDCCH). The group ID is scrambled with a cyclic redundancy check (CRC) of the paging DCI.

In an embodiment, the method further includes obtaining a UE ID of the UE included in the paging DCI, and obtaining the short message included in the paging DCI.

In an embodiment, the method further includes obtaining a short message indicator included in the paging DCI. When the short message indicator indicates that the paging DCI includes the short message, the short message is obtained from the paging DCI. When the short message indicator indicates that the paging message is included in a physical downlink shared channel (PDSCH), the PDSCH is decoded to obtain the paging message based on scheduling information included in the paging DCI. In one example, the short message indicator reuses a bit field of a DCI format specified in 3GPP LTE standards.

In an embodiment, the method further includes obtaining a time offset with respect to a reference time from scheduling information included in the paging DCI, and determining a timing of a PDSCH carrying the paging message according to the time offset with respect to the reference time. In one example, the reference time is an end of an OFDM symbol, a time slot, a subframe, a frame that includes a last SS block of the SS block burst, or an end of a PDCCH. In one example, a physical broadcast channel (PBCH) of the SS block is decoded to obtain system information that indicates the reference time. In one example, the system information indicates a number of SS blocks included in the SS block burst.

In an embodiment, the paging message is carried in a time slot different from a time slot carrying the paging DCI.

Aspects of the disclosure further provide an UE. The UE can include processing circuitry configured to perform a downlink synchronization based on an synchronization signal (SS) block of an SS block burst received from a base station in a beamformed wireless communication system, detect a paging downlink control information (DCI) that is collocated with the SS block, and obtain a paging message or a short message based on the paging DCI.

Aspects of the disclosure provide another paging method. The method can include transmitting from a BS to a UE an SS block burst including a sequence of SS blocks, and a paging DCI burst including a sequence of DCIs intended for the UE in a beamformed wireless communication system. Each DCI corresponds to one of the SS blocks. Each DCI is collocated with the corresponding SS block.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
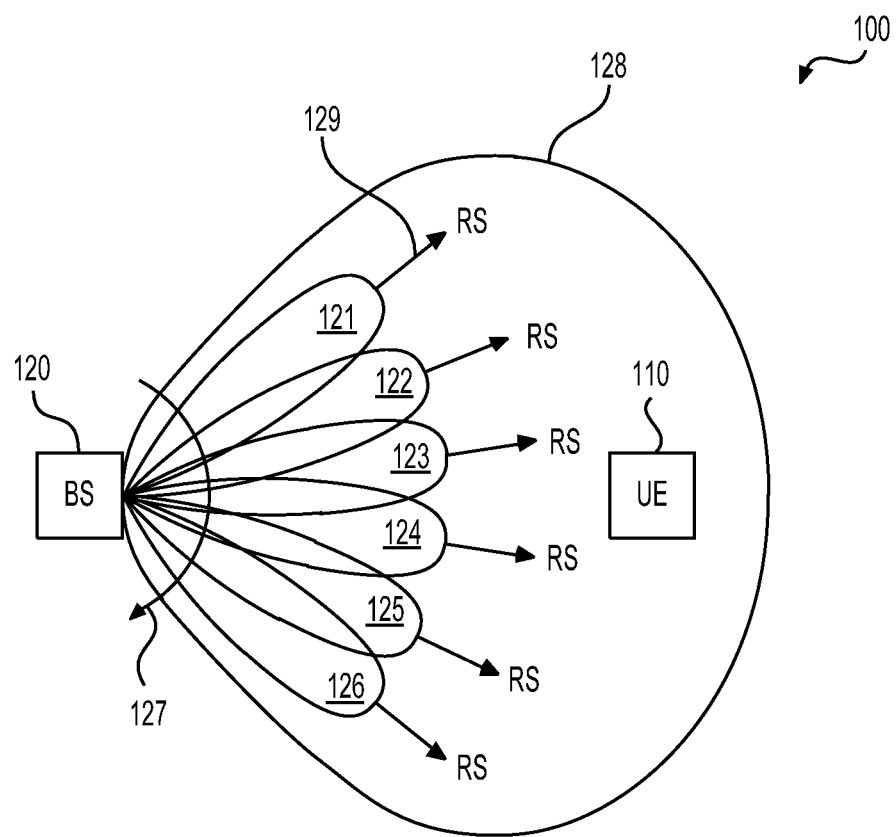
FIG. 1 shows a beam-based wireless communication system according to an embodiment of the disclosure.

FIG. 1 shows a beam-based wireless communication system 100 according to an embodiment of the disclosure. The system 100 can include user equipment (UE) 110 and a base station (BS) 120. The system 100 can employ the 5th generation (5G) wireless communication technologies developed by the 3rd Generation Partnership Project (3GPP). For example, millimeter Wave (mm-Wave) frequency bands and beamforming technologies can be employed in the system 100. Accordingly, the UE 110 and the BS 120 can perform beamformed transmission or reception. In beamformed transmission, wireless signal energy can be focused on a specific direction to cover a target serving region. As a result, an increased antenna transmission (Tx) gain can be achieved in contrast to omnidirectional antenna transmission. Similarly, in beamformed reception, wireless signal energy received from a specific direction can be combined to obtain a higher antenna reception (Rx) gain in contrast to omnidirectional antenna reception. The increased Tx or Rx gain can compensate path loss or penetration loss in mm-Wave signal transmission.

The BS 120 can be a base station implementing a gNB node as specified in 5G new radio (NR) air interface standards developed by 3GPP. The BS 120 can be configured to control one or more antenna arrays to form directional Tx or Rx beams for transmitting or receiving wireless signals. In some examples, different sets of antenna arrays are distributed at different locations to cover different serving areas. Each such set of antenna arrays can be referred to as a transmission reception point (TRP).

In FIG. 1 example, the BS 120 can control a TRP to form Tx beams 121-126 to cover a cell 128. The beams 121-126 can be generated towards different directions. The beams 121-126 can be generated simultaneously or in different time intervals in different examples. In one example, the BS 120 is configured to perform a beam sweeping 127 to transmit downlink L1/L2 control channel and/or data channel signals. During the beam sweeping 127, Tx beams 121-126 towards different directions can be successively formed in a time division multiplex (TDM) manner to cover the cell 128. During each time interval for transmission of one of the beams 121-126, a set of L1/L2 control channel data and/or data channel data can be transmitted with the respective Tx beam. The beam sweeping 127 can be performed repeatedly with a certain periodicity. In alternative examples, the beams 121-126 may be generated in a way other than performing a beam sweeping. For example, multiple beams towards different directions may be generated at a same time. In other examples, different from FIG. 1 example where the beams 121-126 are generated horizontally, the BS 120 can generate beams towards different horizontal or vertical directions. In an example, the maximum number of beams generated from a TRP can be 64.

Each beam 121-126 can be associated with various reference signals (RSs) 129, such as channel-state information reference signal (CSI-RS), demodulation reference signal (DMRS), or synchronization signals (SSs) (e.g., primary synchronization signal (PSS), and secondary synchronization signal (SSS)). Those RSs can serve for different purposes depending on related configurations and different scenarios. For example, some RSs can be used as beam identification RSs for purpose of identifying a beam, and/or beam quality measurement RSs for monitoring beam qualities. Each beam 121-126, when transmitted at different occasions, may carry different signals, such as different L1/L2 data or control channels, or different RSs.

In one example, the beams 121-126 of the cell 128 can be associated with synchronization signal blocks (SS blocks) (also referred to as SS/PBCH blocks). For example, an SS block can include SSs (e.g., PSS, SSS) and a physical broadcast channel (PBCH) carried on several consecutive symbols in an orthogonal frequency division multiplexing (OFDM) based system. For example, the BS 120 may periodically transmit a sequence of SS blocks (referred to as an SS block burst). The SS block burst may be transmitted by performing a beam sweeping. For example, each SS block of the SS block burst is transmitted using one of the beams 121-126. The sequence of SS blocks may each carry an SS block index indicating a timing or location of each SS block among the sequence of SS blocks.

The UE 110 can be a mobile phone, a laptop computer, a vehicle carried mobile communication device, a utility meter fixed at a certain location, and the like. Similarly, the UE 110 can employ one or more antenna arrays to generate directional Tx or Rx beams for transmitting or receiving wireless signals. While only one UE 110 is shown in FIG. 1, a plurality of UEs can be distributed within or outside of the cell 128, and served by the BS 120 or other BSs not shown in FIG. 1. In FIG. 1 example, the UE 110 is within the coverage of the cell 128.

The UE 110 can operate in radio resource control (RRC) connected mode or RRC idle mode. For example, when the UE 110 is operating in RRC connected mode, an RRC context is established and known to both the UE 110 and the BS 120. The RRC context includes parameters necessary for communication between the UE 110 and the BS 120. An identity of the UE 110, such as a cell radio network temporary identified (C-RNTI), can be used for signaling between the UE 110 and the BS 120.

When the UE 110 is operating in RRC idle mode, there is no RRC context established. The UE 110 does not belong to a specific cell. For example, no data transfer may take place. The UE 110 sleeps most of the time in order to save power, and wake up according to a predefined cycle to monitor if a paging message is coming from network side of the system 100. Triggered by a paging message (e.g., a connection establishment request), the UE 110 may transfer from RRC idle mode to RRC connected mode. For example, the UE 110 can establish uplink synchronization, and an RRC context can be established in both the UE 110 and the BS 120.

The system 100 uses a paging mechanism to convey a paging message to the UE 110 in some embodiments. The paging message can be originated from the BS 120 or a core network element of the system 100. For example, a core network element can transmit a paging message to the UE 110 in RRC idle mode to initiate a connection setup in response to an incoming call. The BS 120 may transmit a paging message to inform the UE 110 (either in RRC idle mode or RRC connected mode) about a change in system information, an emergency notification, an earthquake or tsunami warning notification, and the like.

In some examples, the paging message is carried in an L1/L2 downlink data channel, such as a physical downlink shared channel (PDSCH). Corresponding to the PDSCH carrying the paging message, downlink control information (DCI) containing scheduling information of the PDSCH can be carried in an L1/L2 downlink control channel, such as a physical downlink control channel (PDCCH). Such type of DCI for indicating a paging transmission can be referred to as a paging DCI, and the corresponding PDCCH can be referred to as a paging PDCCH. In addition, a group identity, such as a paging radio network temporary identifier (P-RNTI), can be attached to the paging DCI. For example, a cyclic redundancy check (CRC) of the paging DCI may be scrambled with the P-RNTI. The P-RNTI can be preconfigured to a group of UEs and used for identifying a DCI as a paging DCI.

According to an aspect of the disclosure, the BS 120 can be configured to transmit a paging DCI together with an SS block. In other words, the paging DCI and the respective SS block are collocated within a time interval corresponding to a beam 121-126. For example, the BS 120 can periodically transmit SS block bursts with a cycle of, e.g., 20 ms or 40 ms. Each SS block burst may include a sequence of SS blocks each transmitted with one of the beams 121-126 during a beam sweeping.

A paging cycle may be configured at the BS 120 for a group of UEs including the UE 110, and the group can be associated with a group identity P-RNTI. The paging cycle can be the same as or larger than the SS block burst cycle. A time window for performing a potential paging transmission can be defined for each paging cycle. Particularly, the time window can correspond to a time period for transmission of an SS block burst. When an SS block is transmitted with one of the beams 121-126, a paging DCI can be transmitted by using the same beam. The sequence of paging DCIs that are transmitted together with the sequence of SS blocks of an SS block burst can be referred to as a paging burst.

The UE 110 can be configured with the paging cycle described above for paging monitoring operations during RRC idle mode in some examples. For example, the UE 110 in RRC idle mode can wake up during predefined time intervals, and monitor whether a paging DCI or paging message is coming from the BS 120. The time window as described above and paging occasions (each paging occasion corresponds to a paging DCI transmission within the time window) can also be configured to the UE 110. The UE can accordingly perform PDCCH decoding at the paging occasions within the time window.

For example, corresponding to a paging occasion, the UE 110 may first establish synchronization with the BS 120 based on reception of a PSS and an SSS in an SS block. Then, the UE 110 may perform a blind PDCCH decoding to search for a paging DCI associated with a P-RNTI assigned to the UE 110. If such a paging DCI is found, the UE 110 may locate the PDSCH according to the scheduling information contained in the paging DCI.

Similarly, a paging circle may be defined for paging monitoring operations during RRC connected mode in some examples. The UE 110 in connected mode can accordingly monitor paging transmissions during respective paging occasions.

Figures 2A, 2B, 2C:
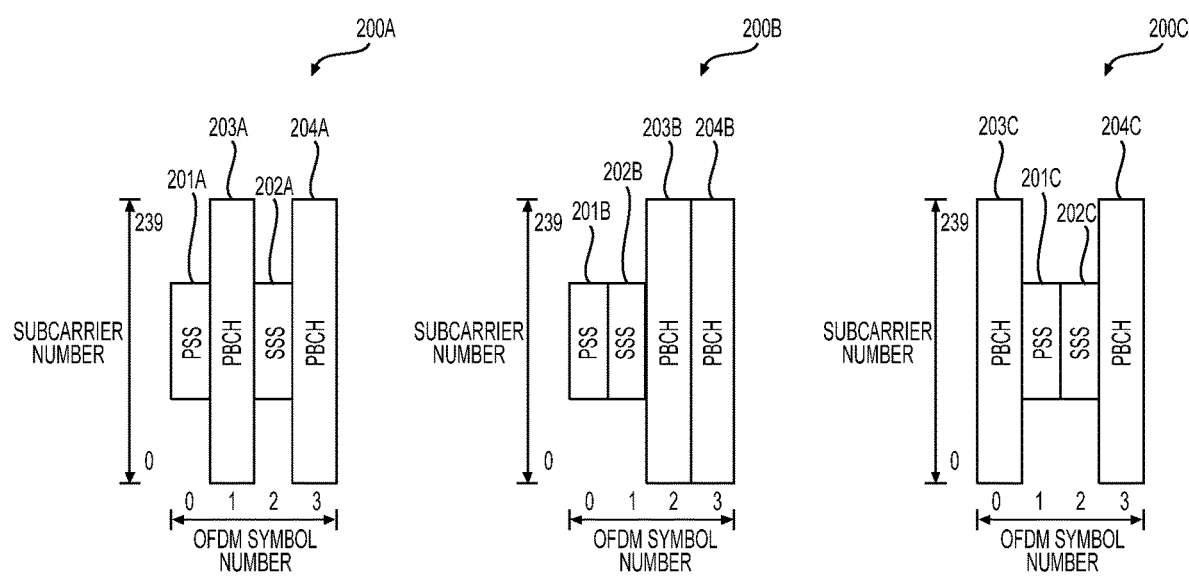
FIGS. 2A-2C show examples of SS blocks with different structures used in the system according to an embodiment of the disclosure.

FIG. 2A shows an example of an SS block 200A used in the system 100 according to an embodiment of the disclosure. The SS block 200A can include a PSS 201A, an SSS 202A, and a PBCH 203A/204A. Those signals can be carried in resource elements (REs) on a time-frequency resource grid as shown in FIG. 2A.

In one example, the SS block 200A can be distributed over 4 OFDM symbols in time domain and occupy a 20 resource block (RB) bandwidth in frequency domain. As shown in FIG. 2A, the 4 OFDM symbols are numbered from 0 to 3, while the 20 RB bandwidth includes 240 subcarriers numbered from 0 to 239. The PSS 201A can occupy REs at symbol 0 and subcarriers 56-182. The SSS 202A can occupy REs at symbol 2 and subcarriers 56-182. The PBCH 203 can be located at symbols 1 and 3 occupying 20 RBs. In alternative examples, the PBCH 203 can be located at symbols 1, 2, and 3, occupying 20 RBs at symbols 1 and 3, and 8RBs (96 subcarriers) at symbol 2 that are not occupied by the SSS 202A.

FIGS. 2B-2C show two additional examples of SS blocks 200B and 200C used in the system 200 according to some embodiments. The SS blocks 200B and 200C have a structure similar to the SS block 200A except the position of the PBCH portion 203B or 203C. In the SS block 200B, the two PBCH portions 203B and 204B are adjacent to each other. In the SS block 200C, the PBCH portion 203C is positioned at the front of the SS block 200C. In alternative examples, an SS block having a structure or size different from FIGS. 2A-2C may be used in the system 100.

Figure 3:
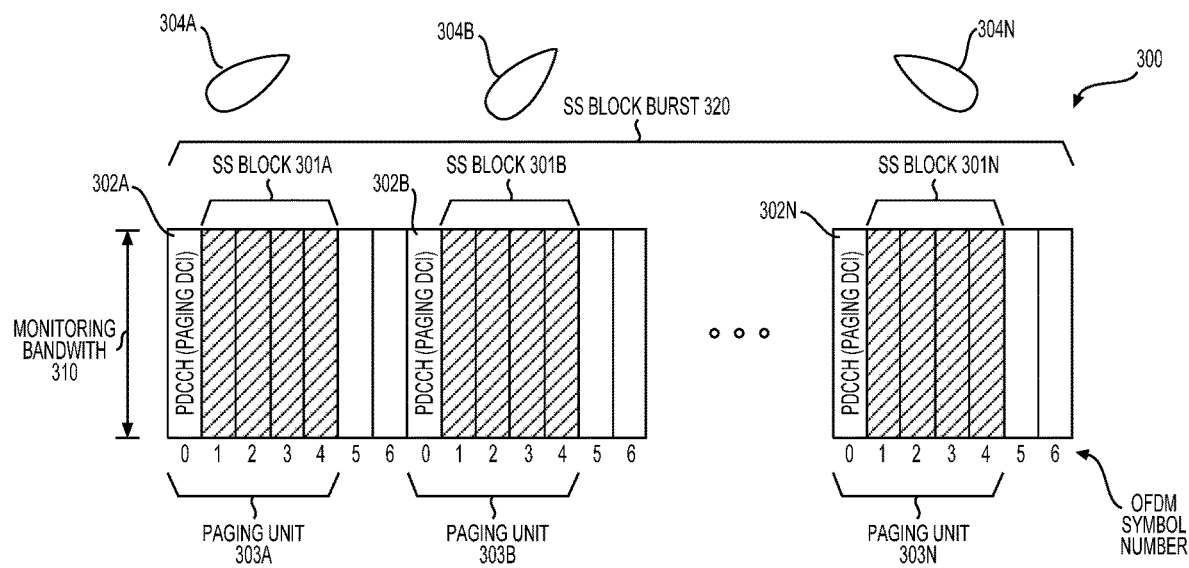
FIG. 3 shows a sequence of OFDM symbols carrying an SS block burst and a paging burst according to an embodiment of the disclosure.

FIG. 3 shows a sequence 300 of OFDM symbols carrying an SS block burst 320 and a paging burst 302A-302N according to an embodiment of the disclosure. The SS block burst 320 includes a sequence of SS blocks 301A-301N. The SS block burst 320 can be transmitted by performing a beam sweeping during which a sequence of beams 304A-304N are generated. Each of the SS blocks 301A-301N can be transmitted by the respective beams 304A-304N.

The paging burst 302A-302N includes a sequence of paging DCIs 302A-302N. Each DCI 302A-302N can be carried in a PDCCH. As shown, each paging DCI or respective PDCCH is collocated with a respective SS block 301A-301N within a set of OFDM symbols. In other words, the OFDM symbols carrying the paging DCI and the respective SS block are adjacent to each other in time domain and frequency domain. For example, as shown in FIG. 3, the paging DCI 302A and the SS block 301A are collocated within a set of OFDM symbols numbered from 0 to 4. The symbol 0 carrying the paging DCI 302A and the symbols 1-4 carrying the SS block 301A are adjacent to each other. The adjacent paging DCI or PDCCH 302A and the SS block 301A forms a paging unit 303A. As shown, a sequence of paging unit 303A-303N are formed during transmission of the SS block burst 320 and the paging burst 302A-302N.

As shown in the FIG. 3 example, the sequence 300 of OFDM symbols can have a bandwidth 310 that is configured to be a minimum bandwidth that can contain the SS blocks 301A-301N in frequency domain. Under such configuration, the UE 110 can be configured to monitor this minimum bandwidth 310 for receiving signals of the SS blocks 301A-301N and the paging DCIs 302A-302N. Compared with monitoring a larger bandwidth than the bandwidth 310, the UE 110 may save power.

While in the above example, the first OFDM symbols (numbered 0) in every 7 OFDM symbol carries one PDCCH that carries one paging DCI, in other examples, multiple PDCCHs may be carried in each of the first OFDM symbols. A subset of the multiple PDCCHs in each of the first OFDM symbols may each carry a paging DCI, for example, configured for multiple groups of UEs. Accordingly, multiple paging bursts may be transmitted together with the SS block burst 320.

In FIG. 3 example, the SS blocks 301A-301N are arranged to be transmitted for every 7 OFDM symbols, and occupy the OFDM symbols numbered from 1 to 4. However, in other examples, a sequence of SS blocks of an SS block burst may be arranged differently. For example, according to the 3GPP NR standards, corresponding to different numerology (carrier spacing) configurations, a frame may have different structures, such as different number of time slots in a subframe, or different OFDM symbols in a subframe. For example, a time slot may include 7, 14, or 28 OFDM symbols. Thus, corresponding to different subframe structures, positions of a sequence of SS blocks of an SS block burst may be arranged differently from what is shown in FIG. 3.

FIGS. 4A-4D show examples of paging units 400A-400D having different structures according to embodiments of the disclosure. Each paging unit 400A-400D may have a monitoring bandwidth 401A-401D, respectively. For example, each monitoring bandwidth 401A-401D can be a minimum bandwidth for containing a respective SS block in some examples, or can be a bandwidth larger than the minimum bandwidth in other examples.

Figure 4A:
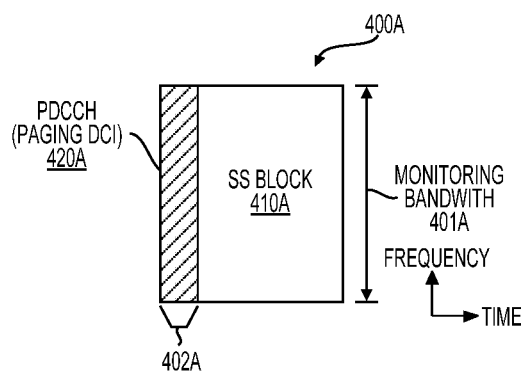
FIGS. 4A-4D show examples of paging units having different structures according to embodiments of the disclosure.

In the paging unit 400A in FIG. 4A, one or more PDCCHs 420A each carrying a paging DCI are carried in one or more OFDM symbols 402A that are adjacent to and in front of an SS block 410A. In the paging unit 400B in FIG. 4B, one or more PDCCHs 420B each carrying a paging DCI are carried in one or more OFDM symbols 402B that are adjacent to and behind an SS block 410A. For example, the SS block 410A or 410B may have a structure similar to one of the FIGS. 2A-2C.

In the paging unit 400C, one or more PDCCHs 420C each carrying a paging DCI are carried in one or more OFDM symbols 402C that are adjacent to and in front of an SS block 410C, and in one or more OFDM symbols 403C that carry an PSS or SSS of the SS block 410C. Similarly, in the paging unit 400D, one or more PDCCHs 420D each carrying a paging DCI are carried in one or more OFDM symbols 402D that are adjacent to and behind an SS block 410D, and in one or more OFDM symbols 403D that carry an PSS or SSS of the SS block 410D.

As shown in the above example, a paging PCI is collocated with a respective SS block within a paging unit. Such an arrangement can reduce a size of time window for monitoring paging transmissions during an SS block burst transmission compared with having a gap (one or more OFDM symbols) between the paging DCI and the respective SS block. In addition, when the paging PCI is adjacent to the respective SS block in time domain and frequency domain, the paging PCI and the respective SS block can be said to be quasi collocated. Accordingly, parameters reflecting channel conditions, such as Doppler shift, Doppler spread, average delay, delay spread, obtained during a synchronization process performed using the respective SS block can be used for decoding a PDCCH carrying the paging PCI, thus improving the respective decoding performance.

Figure 4B:
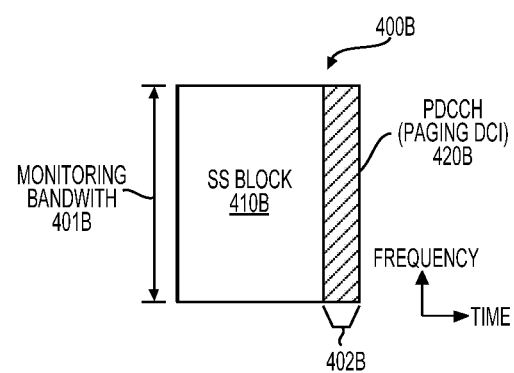
Figure 4C:
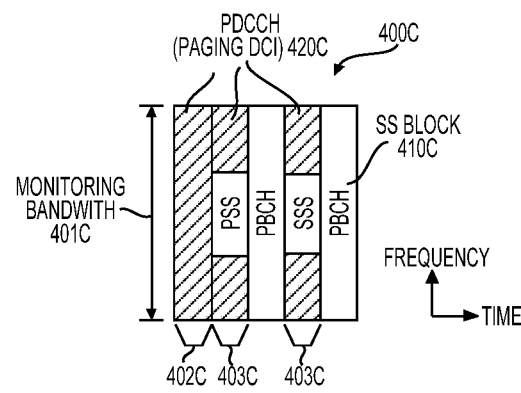
Figure 4D:
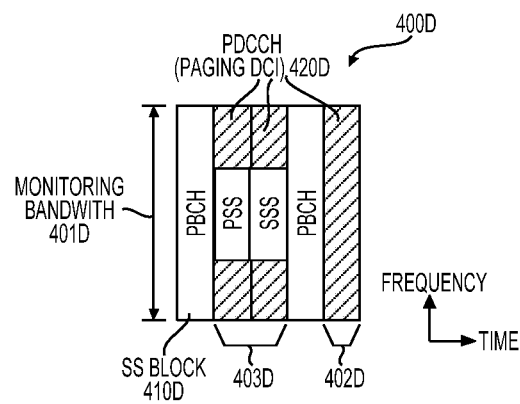

Comparing with the FIGS. 4A and 4B examples, more time-frequency transmission resources (e.g., resource elements (REs)) can be allocated for PDCCH transmissions in the FIGS. 4C and 4D examples. Accordingly, a larger capacity for carrying paging DCIs can be obtained.

Figure 5:
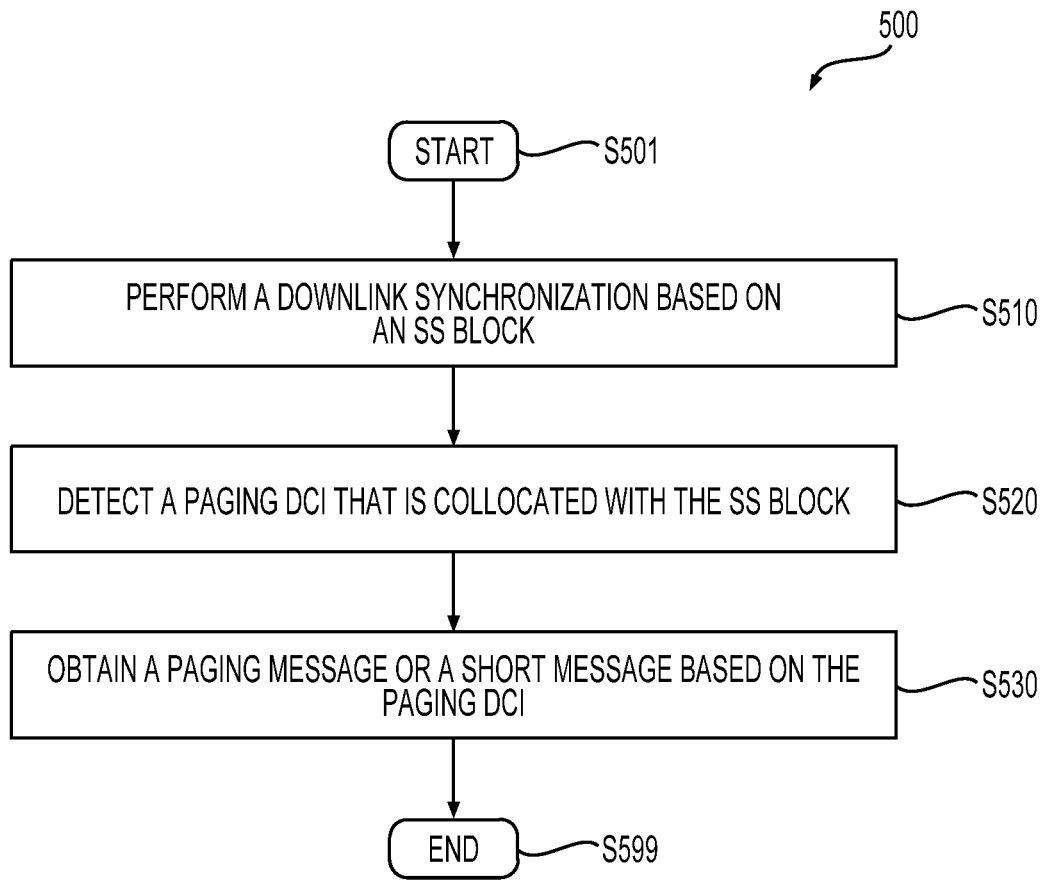
FIG. 5 shows an example paging process according to an embodiment of the disclosure.

FIG. 5 shows an example paging process 500 according to an embodiment of the disclosure. The process 500 can be performed at the UE 110 to detect a paging DCI and further to obtain a paging message or a short message. The UE 110 may operate in RRC idle mode. The paging DCI can be carried in a paging unit transmitted from the BS 110. The paging unit may include the paging DCI and an SS block collocated with each other in time domain and in frequency domain. The process 500 can start from S501 and proceed to S510.

At S510, a downlink synchronization is performed based on an SS block. For example, the UE 110 can periodically wake up according to a paging cycle. When the UE 110 wakes up, the UE 110 can listen for paging within a paging monitoring time window. The time window may corresponds to an SS block burst transmission of the BS 120. For example, the BS 120 may perform a beam sweeping to transmit a sequence of SS blocks of the SS block burst to cover a serving area. At the same time, assuming a paging DCI is transmitted to the UE 110, a paging burst including a sequence of the paging DCIs can be transmitted together with the SS block burst. Each paging DCI and each respective SS block are collocated to form a paging unit.

The UE 110 may listen to signals carrying the SS blocks continuously during the time window. As the SS blocks are transmitted in a beamformed manner towards different directions from the BS 120, different SS blocks may have different signal quality when reaching the UE 110. When an SS block having a signal quality above a threshold is received, the UE 110 may recognize the PSS and SSS carried in the SS block, and subsequently synchronize with the BS 120 based on the PSS and SSS.

In alternative examples, the UE 110 may use beam quality measurement results obtained from a previous paging monitoring time window, and perform synchronization with an SS block carried on a specific beam that has a best quality. For example, during each paging monitoring time window, the UE 110 may measure beam qualities based on SS blocks in an SS block burst, and store beam indexes of beams having a quality above a threshold. Then, during a next time window, beam quality measurement results can be used to select one or more beams for SS block detection and synchronization.

While detecting the PSS and SSS, the UE 110 may buffer sample data of PDCCHs that are collocated with the respective SS block within a respective paging unit. One of the PDCCHs may carry the paging DCI intended for the UE 110.

At S520, the paging DCI collocated with the SS block is detected. For example, after the synchronization, the UE 110 can proceed to decode PDCCHs collocated with the SS block. As shown in FIGS. 4A-4D, depending on a structure of the paging unit, one or more PDCCHs may be carried on OFDM symbols adjacent to the SS block or carried on OFDM symbols adjacent to the SS block and OFDM symbols carrying the PSS and SSS of the SS block. The UE 110 can blindly decode those PDCCHs to search for a group identity (e.g., P-RNTI) on a PDCCH. When the P-RNTI is found, a respective paging DCI having a CRC scrambled with the P-RNTI can be determined to be the paging DCI intended for the UE 110. In one example, when no paging DCI intended for the UE 110 is detected, the UE 110 may turn to sleep state until a next wake up time.

At S530, a paging message or a short message can be obtained based on the detected paging DCI. For example, the paging DCI may carry different information. By interpreting the paging DCI, it can be determined a paging message is carried in a downlink data channel, such as a PDSCH. The UE 110 may proceed to locate and process the PDSCH based on scheduling information carried in the paging DCI. Alternatively, a message may be carried in the paging DCI itself. The UE 110 can obtain the message directly from the paging DCI. Such a message is referred to as a short message in contrast to the paging message carried in a PDSCH. Several examples are described below for illustrating different types of paging DCIs and how a paging message or short message is obtained by interpreting a paging DCI.

After obtaining and processing the paging message or the short message, the UE 110 can accordingly take an action in response to the received message, such as obtaining updated system information, or performing a random access process to establish a connection with the BS 120 for a coming call, or a data reception request. The process 500 can then proceed to S599, and terminate at S599.

Figure 6:
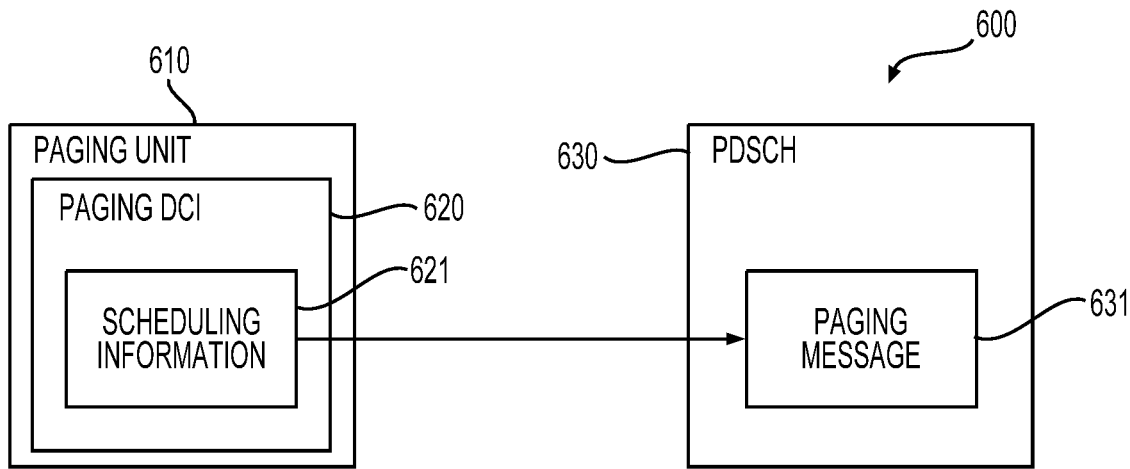
FIGS. 6, 7, 8A-8B, and 9 show example paging schemes according to embodiments of the disclosure.

FIG. 6 shows an example paging scheme 600 according to an embodiment of the disclosure. As shown, a paging unit 610 includes a paging DCI 620 intended for the UE 110. The paging unit 610 may have one of various structures, such as what is shown in FIGS. 4A-4D. The paging DCI 620 can include a set of bit fields. One or more bit fields contain a set of scheduling information 621 indicating a paging message 631 carried in a PDSCH 630.

For example, the scheduling information 621 may indicate coding and modulation schemes used for decoding the PDSCH 630. The scheduling information 621 may indicate time-frequency resources carrying the PDSCH 630 such that the UE 110 can locate the PDSCH 630 in time and frequency domain. In one example, the scheduling information 621 provides timing information indicating where the PDSCH 630 is positioned in time domain. For example, a time offset with respect to a reference time can be provided. For example, the time offset can be indicated by a number of subframes, time slots, OFDM symbols, or a combination thereof. The reference time, for example, can be a starting position of a subframe within a paging monitoring time window, an ending position of an SS block burst (e.g. ending of a time slot, a subframe, or a frame containing a last SS block of the SS block burst) within the paging monitoring time window, and the like.

As shown, the PDSCH 630 carrying the paging message 631 may be positioned behind the paging unit 610 in time domain. For example, a gap including zero, one or more time slots or subframes may exist between the paging unit 610 and the PDSCH 630. When the UE 110 processes the paging unit 610, the UE 110 does not buffer sample data of the PDSCH 630. After the paging DCI 620 intended for the UE 110 is detected, the UE 110 proceeds to receive and process the PDSCH 630.

In some examples, a paging DCI and an associated PDSCH scheduled by the paging DCI are arranged close to each other in time domain, for example, within a same time slot. Accordingly, while detecting the paging DCI, a UE may be configured to buffer the signal carrying the associated PDSCH. However, detecting a paging DCI intended for the UE may be rare in some scenarios, and blindly buffering the associated PDSCH might be useless most of the times. Compare with those examples, introducing a gap between a paging unit and an associated PDSCH as shown in FIG. 6 example has an advantage of saving power when a probability of receiving a paging DCI is low for the UE 110. Under such configuration, when no paging DCI indented for the UE 110 is detected, receiving and decoding a PDSCH will be skipped. No buffering operation is performed.

During the paging process 500, at S530, the UE 110 can be configured to interpret the scheduling information 621. For example, the UE 110 can obtain the scheduling information 621 indicating the paging message 631, and proceed to receive and decode the PDSCH 630 to obtain the paging message 631 based on the scheduling information 621. For example, the paging message 631 may carry a set of UE identities, such as identities assigned by the network side of the system 100, or international mobile subscriber identities (IMSIs). The UE 110 may check whether its identity is included in the set of UE identities. If the UE 110's identity is found in the set of UE identities, the UE 110 can determine the paging message 631 is intended for the UE 110, and subsequently obtain related information from the paging message 631. Otherwise, the UE 110 may determine the paging message 631 is not intended for the UE 110.

Figure 7:
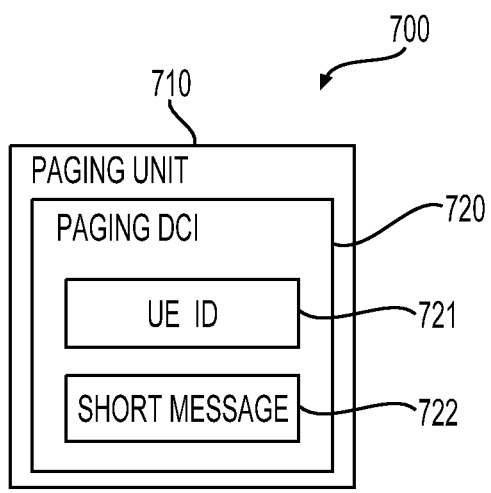

FIG. 7 shows an example paging scheme 700 according to an embodiment of the disclosure. As shown, a paging unit 710 includes a paging DCI 720 intended for the UE 110. The paging DCI 720 carries a UE specific message. Specifically, the paging DCI 720 can include a UE identity 721 and a short message 722. The UE identity 721 indicates the paging DCI 720 includes the short message 722 intended for the UE 110. For example, the UE identity 721 can be an international mobile subscriber identity (IMSI), or an identifier assigned by the network side of the system 100. The short message can include various types of information, such as uplink downlink time slot configuration, time slot format, changes of system information, emergency notification, ETWS notification, CMAS notification, circuit switch connection request, packet switch data connection request, short message service connection request, and the like. In alternative examples, more than one UE identities may be included in the paging DCI that is intended for multiple UEs.

Including a UE specific message in a paging DCI can bypass transmission of a PDSCH for carrying a paging message. Accordingly, the UE 110 can avoid waking up to decode a PDSCH in order to obtain a paging message. Power consumption of the UE 110 can thus be reduced.

During the paging process 500, at S530, the UE 110 can be configured to detect the UE identity 721 included in the paging DCI 720, and directly obtain the short message 722 intended for the UE 110. When the paging DCI 720 does not carry the UE identity 721 (e.g., no UE identity 721 is detected), the UE 110 can know the paging DCI 720 does not carry a short message intended for the UE 110, although the paging DCI 720 carries the group identity P-RNTI assigned to the UE 110. Instead, the short message may be intended for other UEs of the group identity.

Figure 8A:
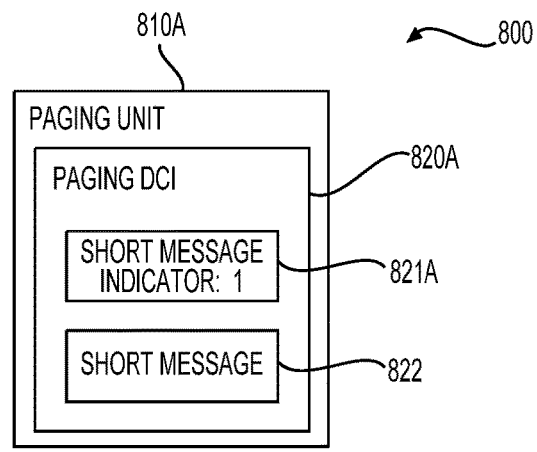
Figure 8B:
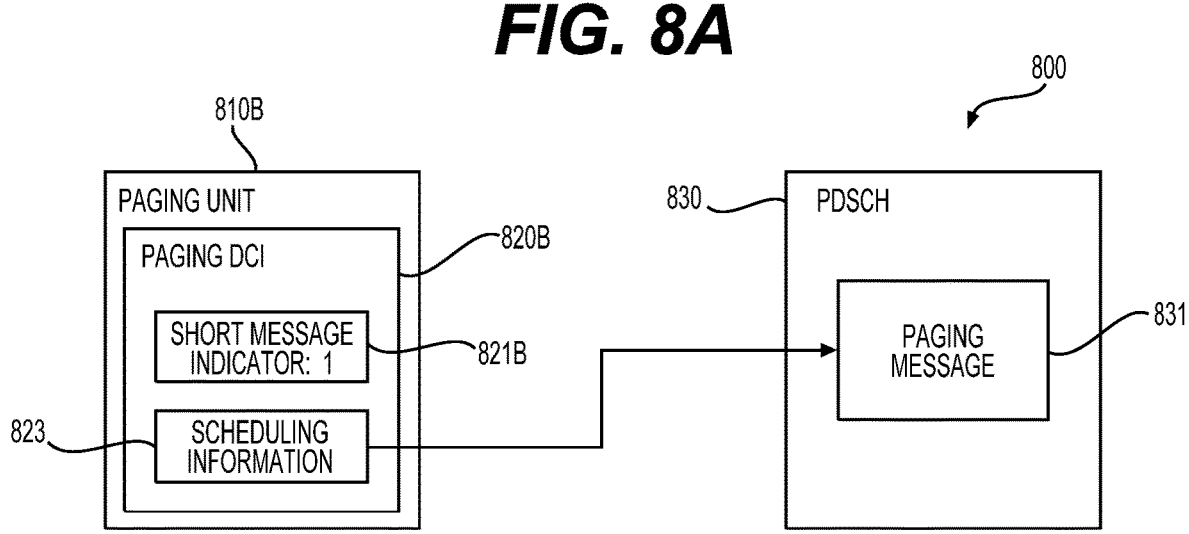

FIGS. 8A-8B shows an example paging scheme 800 according to an embodiment of the disclosure. In FIG. 8A, a paging unit 810A includes a paging DCI 820A intended for the UE 110. Specifically, the paging DCI 820A can include a short message indicator 821A indicating whether a short message is included in the paging DCI 820A, or a paging message is carried in a separate PDSCH. In one example, the paging DCI 820A uses a bit field of 1 bit as the short message indicator 821A. For example, when the short message indicator 821A has a value of 1 as shown in FIG. 8A, a short message 822 is contained in the paging DCI 820A. Similar to FIG. 7 example, the UE 110 can directly obtain the short message 822 from the paging DCI 820A.

Corresponding to FIG. 8A example, FIG. 8B shows another scenario where a paging unit 810B includes a paging DCI 820B. The paging DCI 820B includes a short message indicator 821B having a value of 0, indicating a paging message 831 is carried in a PDSCH 830. The paging DCI 820 can further include scheduling information 823 useful for decoding the PDSCH 830. The scheduling information 823 can be similar to the scheduling information 621 in the FIG. 6 example.

In one example, a bit field in a DCI format specified in 3GPP LTE standards is reused as the bit field of the short message indicator 821A/821B in FIGS. 8A-8B example. Accordingly, the LTE DCI format can be reused in the system 100 without changing a size of the LTE DCI format. As known in the art, adopting a new size of a DCI format may increase complexity of blindly decoding PDCCHs. The paging scheme 800 reusing the LTE DCI format can avoid the above disadvantage. Of course, in alternative examples, a new DCI format may be used for introducing the short message indicator.

Using a short message indicator in a paging DCI provides flexibility for deliver paging messages. For example, when an amount of paging messages are small in some scenarios, the paging messages can be delivered in the form of short messages that are included in respective paging DCIs. In this way, additional decoding of PDSCHs can be avoided, reducing power consumption of associated UEs. In contrast, when an amount of paging messages are large, and there is no enough capacitance of paging PDCCHs for carrying the paging messages, the paging messages can be delivered using PDSCHs.

During the paging process 500, at S530, the UE 110 can be configured to inspect a short message indicator in the paging DCI. When the short message indicator indicates the paging DCI includes a short message (corresponding to FIG. 8A example), the UE 110 may obtain the respective short message. When the short message indicator indicates a paging message is carried in a PDSCH transmitted subsequently, the UE 110 may proceed to decode the PDSCH to obtain the paging message based on scheduling message included in the paging DCI. The UE 110 may further process the paging message, for example, to determine whether the paging message carries an identity of the UE 110.

In addition, the paging scheme 800 is combined with the paging scheme 700 in some examples. For example, a paging DCI can include a short message indicator indicating a short message is contained in the paging DCI, and additionally a UE identity of the UE 110. Accordingly, during the paging process 500, at S530, the UE 110 can first inspect the short message indicator to determine if a short message is available, and subsequently determine if the identity of the UE 110 is included in the paging DCI. Then, the UE 110 can obtain the short message intended for the UE 110. In alternative examples, the paging DCI may not include the identity of the UE 110. Accordingly, the UE 110 can determine the short message is not intended for the UE 110. Similarly as described above, more than one UE identities may be included in the paging DCI including a short message indicator.

Figure 9:
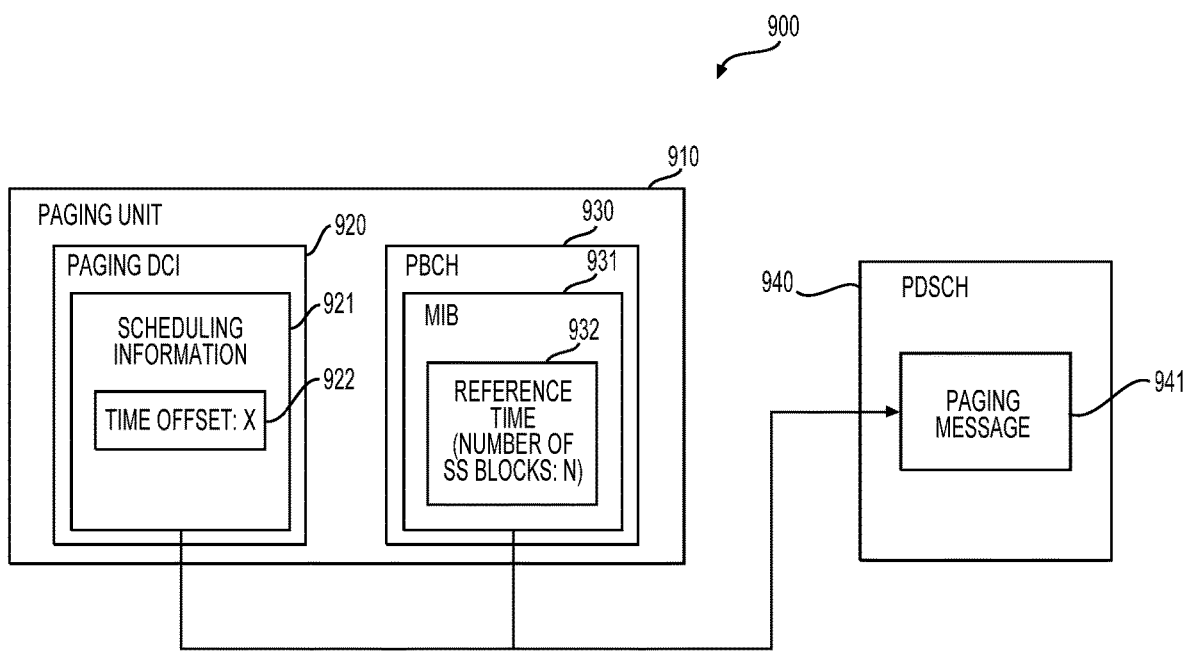

FIG. 9 shows an example paging scheme 900 according to an embodiment of the disclosure. As shown, a paging unit 910 includes a paging DCI 920 intended for the UE 110. Similar to the FIG. 6 or FIG. 8B example, the paging DCI 921 can include scheduling information 921. The scheduling information 921 can be similar to the scheduling information 621 or 823. For example, the scheduling information 921 can include information indicating time-frequency resources allocated for a PDSCH 940 that carries a paging message 941. For example, the scheduling information can include a time offset 922 (e.g., X) with respect to a reference time. Based on the time offset 922 and the reference time, a location of the PDSCH 940 in time domain can be determined.

In addition, the paging unit 910 can include a PBCH 930 that carries system information, such as a master information block (MIB) 931. The MIB 931 can be configured to provide a reference time 932 that can be used in combination with the time offset 922 to indicate the position (timing) of the PDSCH 940 in time domain. For example, the reference time 932 can be defined to be the end of an SS block burst associated with the paging unit 910. For example, the end of the SS block burst can be indicated by an end of a slot, or a subframe that includes a last SS block of the SS block burst.

In one example, the reference time 932 is indicated by a size of the SS block burst. For example, a number (e.g., N) of SS blocks in the SS block burst is provided. According to SS block related configuration information (e.g., periodicity of the SS block burst, starting subframes of SS block bursts), the UE 110 is aware of a beginning of each SS block burst (e.g., a subframe including the first SS block of the SS block burst). Accordingly, based on the size information of the SS block burst, a timing of an end of the SS block burst can be derived which can be used as the reference time 932.

In an alternative example, instead of the scheduling information 921 carrying the time offset 922, a time offset can be preconfigured to the UE 110 from the network side of the system 100. For example, when determining the timing of the PDSCH 940, the UE 110 may combine the preconfigured time offset with the reference time provided by the MIB 931.

Figure 10:
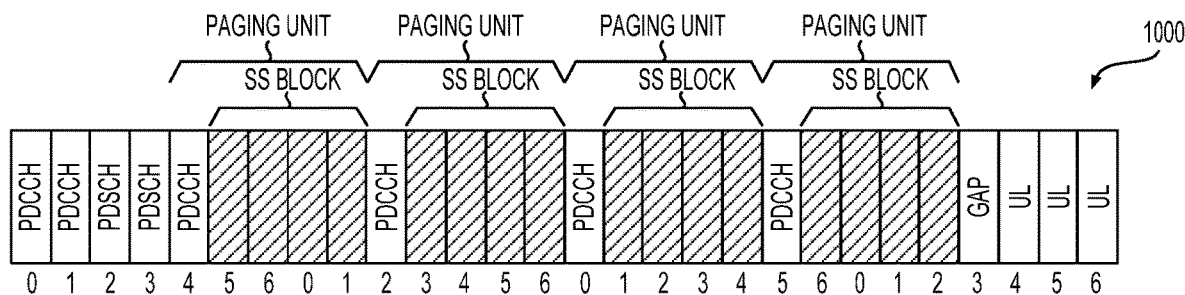
FIGS. 10-12 show additional examples of arranging paging units in sequences of OFDM symbols according to some embodiments.
Figure 11:
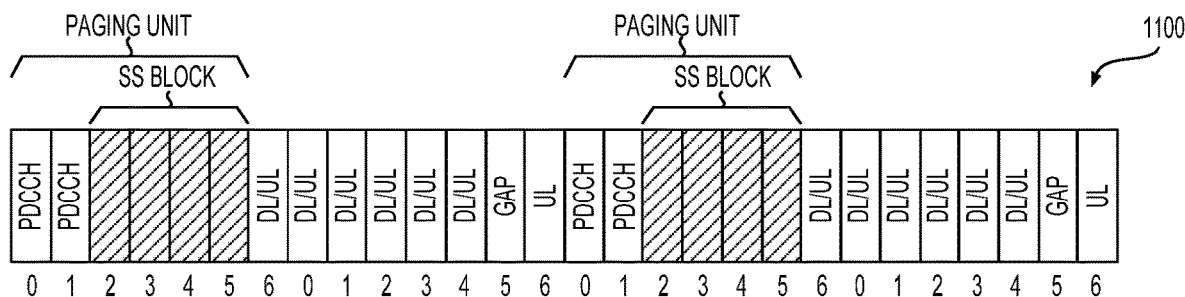
Figure 12:
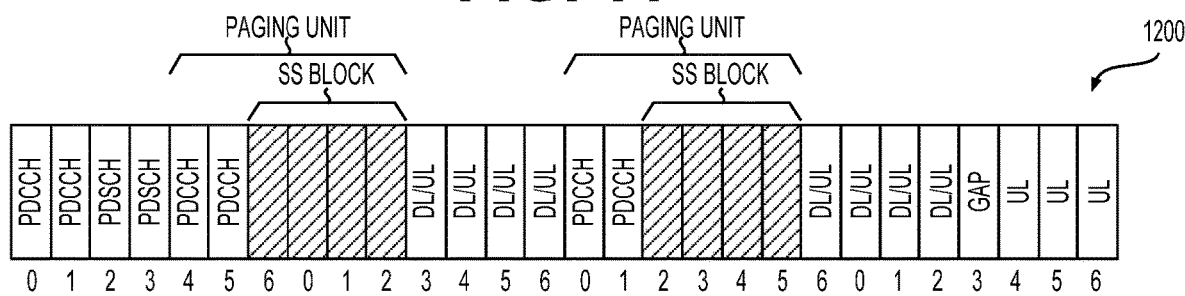

FIGS. 10-12 show additional examples of arranging paging units in sequences of OFDM symbols according to some embodiments. Three sequences 1000, 1100, and 1200 of OFDM symbols are shown. Each sequence may have a minimum monitoring bandwidth that can contain a respective SS block. Each sequence includes 28 OFDM symbols. Each sequence includes several paging units. Each paging unit may include one or two OFDM symbols for carrying PDCCHs. A subset of the PDCCHs may be used for carrying paging DCIs. Symbols that are not occupied by the paging units may be used for downlink (DL) or uplink (UL) transmissions, or used as a gap for switching between DL and UL, as shown in FIGS. 10-12.

In addition, SS blocks of a sequence of paging units in each of the sequences 1000-1200 may have one of the structures in FIGS. 4A-4D or other structures. For example, time-frequency resources of OFDM symbols carrying a PSS or SSS may be assigned for carrying paging DCIs.

Figure 13:
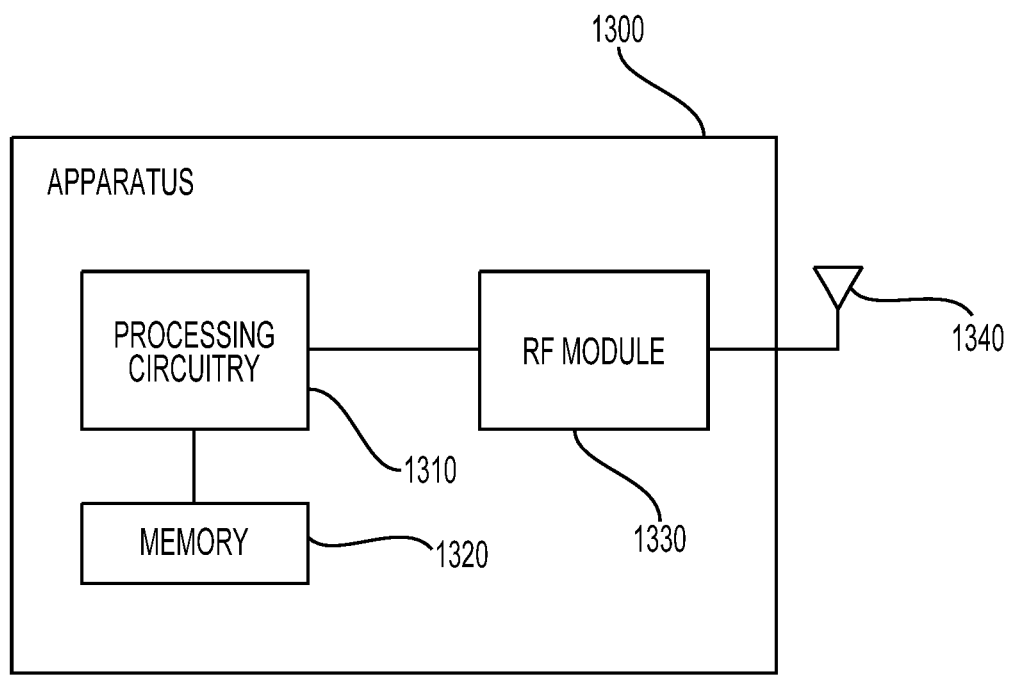
FIG. 13 shows an example apparatus according to embodiments of the disclosure.

FIG. 13 shows an exemplary apparatus 1300 according to embodiments of the disclosure. The apparatus 1300 can be configured to perform various functions in accordance with one or more embodiments or examples described herein. Thus, the apparatus 1300 can provide means for implementation of techniques, processes, functions, components, systems described herein. For example, the apparatus 1300 can be used to implement functions of the UE 110 or the BS 120 in various embodiments and examples described herein. The apparatus 1300 can be a general purpose computer in some embodiments, and can be a device including specially designed circuits to implement various functions, components, or processes described herein in other embodiments. The apparatus 1300 can include processing circuitry 1310, a memory 1320, and a radio frequency (RF) module 1330.

In various examples, the processing circuitry 1310 can include circuitry configured to perform the functions and processes described herein in combination with software or without software. In various examples, the processing circuitry can be a digital signal processor (DSP), an application specific integrated circuit (ASIC), programmable logic devices (PLDs), field programmable gate arrays (FPGAs), digitally enhanced circuits, or comparable device or a combination thereof.

In some other examples, the processing circuitry 1310 can be a central processing unit (CPU) configured to execute program instructions to perform various functions and processes described herein. Accordingly, the memory 1320 can be configured to store program instructions. The processing circuitry 1310, when executing the program instructions, can perform the functions and processes. The memory 1320 can further store other programs or data, such as operating systems, application programs, and the like. The memory can include transitory or non-transitory storage medium. The memory 1320 can include a read only memory (ROM), a random access memory (RAM), a flash memory, a solid state memory, a hard disk drive, an optical disk drive, and the like.

The RF module 1330 receives processed data signal from the processing circuitry 1310 and transmits the signal in a beam-formed wireless communication network via an antenna 1340, or vice versa. The RF module 1330 can include a digital to analog convertor (DAC), an analog to digital converter (ADC), a frequency up convertor, a frequency down converter, filters, and amplifiers for reception and transmission operations. The RF module 1340 can include multi-antenna circuitry (e.g., analog signal phase/amplitude control units) for beamforming operations. The antenna 1340 can include one or more antenna arrays.

The apparatus 1300 can optionally include other components, such as input and output devices, additional or signal processing circuitry, and the like. Accordingly, the apparatus 1300 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

The invention claimed is:

1. A method, comprising:
performing, by processing circuitry of a user equipment (UE), a downlink synchronization based on an synchronization signal (SS) block of an SS block burst received from a base station in a wireless communication system;
detecting, by the processing circuitry of the UE, paging downlink control information (DCI) that includes a short message indicator;
when the short message indicator indicates that the paging DCI includes the short message, obtaining the short message from the paging DCI; and
when the short message indicator indicates that the paging message is included in a physical downlink shared channel (PDSCH), decoding the PDSCH to obtain the paging message based on scheduling information included in the paging DCI.

2. The method of claim 1, wherein the paging DCI is carried in one or more first orthogonal frequency division multiplexing (OFDM) symbols, and/or one or more second OFDM symbols, the one or more first OFDM symbols adjacent to the SS block, the one or more second OFDM symbols carrying a primary synchronization signal (PSS) and/or a secondary synchronization signal (SSS) of the SS block.

3. The method of claim 2, wherein the one or more first OFDM symbols are in front of or behind the SS block.

4. The method of claim 1, further comprising:
searching for a group identity (ID) on a physical downlink control channel (PDCCH), the group ID scrambled with a cyclic redundancy check (CRC) of the paging DCI.

5. The method of claim 1, further comprising:
obtaining a UE ID of the UE included in the paging DCI; and
obtaining the short message included in the paging DCI.

6. The method of claim 1, wherein the short message indicator reuses a bit field of a DCI format specified in 3GPP LTE standards.

7. The method of claim 1, further comprising:
obtaining a UE ID of the UE included in the paging DCI.

8. The method of claim 1, further comprising:
obtaining a time offset with respect to a reference time from scheduling information included in the paging DCI or preconfigured by the base station; and
determining a timing of a PDSCH carrying the paging message according to the time offset with respect to the reference time.

9. The method of claim 8, wherein the reference time is an end of an OFDM symbol, a time slot, a subframe, a frame that includes a last SS block of the SS block burst, or an end of a PDCCH.

10. The method of claim 8, further comprising:
decoding a physical broadcast channel (PBCH) of the SS block to obtain system information that indicates the reference time.

11. The method of claim 10, wherein the system information indicates a number of SS blocks included in the SS block burst.

12. The method of claim 1, wherein the paging message is carried in a time slot different from a time slot carrying the paging DCI.

13. A user equipment (UE), comprising processing circuitry configured to:
- perform a downlink synchronization based on an synchronization signal (SS) block of an SS block burst received from a base station in a wireless communication system;
- detect a paging downlink control information (DCI) that includes a short message indicator;
- when the short message indicator indicates that the paging DCI includes the short message, obtain the short message from the paging DCI; and
- when the short message indicator indicates that the paging message is included in a physical downlink shared channel (PDSCH), decode the PDSCH to obtain the paging message based on scheduling information included in the paging DCI.

14. The UE of claim 13, wherein the paging DCI is carried in one or more first orthogonal frequency division multiplexing (OFDM) symbols, and/or one or more second OFDM symbols, the one or more first OFDM symbols adjacent to the SS block, the one or more second OFDM symbols carrying a primary synchronization signal (PSS) and/or a secondary synchronization signal (SSS) of the SS block.

15. The UE of claim 14, wherein the one or more first OFDM symbols are in front of or behind the SS block.

16. The UE of claim 13, wherein the processing circuitry is further configured to:
- obtain a UE ID of the UE included in the paging DCI; and
- obtain the short message included in the paging DCI.

17. The UE of claim 13, wherein the processing circuitry is further configured to:
- obtain a time offset with respect to a reference time from scheduling information included in the paging DCI or preconfigured by the base station; and
- determine a timing of a PDSCH carrying the paging message according to the time offset with respect to the reference time.

18. A method, comprising:
- transmitting from a base station (BS) a synchronization signal (SS) block burst including a sequence of SS blocks, and a paging downlink control information (DCI) burst including a sequence of paging DCIs in a wireless communication system, each paging DCI corresponding to one of the SS blocks and including a short message indicator having one of two values, a first value of the short message indicator indicating that the paging DCI includes a short message, a second value of the short message indicator indicating that the paging message is included in a physical downlink shared channel (PDSCH) and the paging DCI includes scheduling information of the PDSCH.

19. The method of claim 18, wherein each paging DCI is carried in one or more first orthogonal frequency division multiplexing (OFDM) symbols, and/or one or more second OFDM symbols, the one or more first OFDM symbols adjacent to the respective SS block, the one or more second OFDM symbols carrying a primary synchronization signal (PSS) and/or a secondary synchronization signal (SSS) of the respective SS block.

20. The method of claim 19, wherein the one or more first OFDM symbols are in front of or behind the respective SS block.

* * * * *